B. C. FISHER.
SPRING WHEEL.
APPLICATION FILED JUNE 1, 1918.

1,310,285. Patented July 15, 1919.

Witnesses

Inventor
Bernard C. Fisher
By Victor J. Evans
Attorney

UNITED STATES PATENT OFFICE.

BERNARD CHARLES FISHER, OF JERSEY CITY HEIGHTS, NEW JERSEY.

SPRING-WHEEL.

1,310,285.     Specification of Letters Patent.     Patented July 15, 1919.

Application filed June 1, 1918. Serial No. 237,787.

*To all whom it may concern:*

Be it known that I, BERNARD CHARLES FISHER, a citizen of the United States, residing at Jersey City Heights, in the county of Hudson and State of New Jersey, have invented new and useful Improvements in Spring-Wheels, of which the following is a specification.

This invention relates to resilient wheels, the broad object in view being to eliminate the use of a pneumatic tire and the troubles incident to the use thereof and to provide a wheel structure embodying a high degree of resiliency sufficient to absorb all ordinary road shocks.

A further object of the invention is to provide a novel arrangement of cushioning springs between the outer tire carrying rim and the wheel hub and to provide supporting means for said cushioning springs of such a character as to protect the springs and prevent fracture thereof when excessive loads and shocks are imposed upon the wheel as a whole.

A further object of the invention is to so arrange the springs in connection with the supporting means therefor and the hub and tire carrying rim that the wheel is admirably adapted for use as a driving wheel as well as a steering wheel in connection with motor vehicles.

With the above and other objects in view, the invention consists in the novel construction, combination and arrangement of parts, herein fully described, illustrated and claimed.

In the accompanying drawings:—

Figure 1:
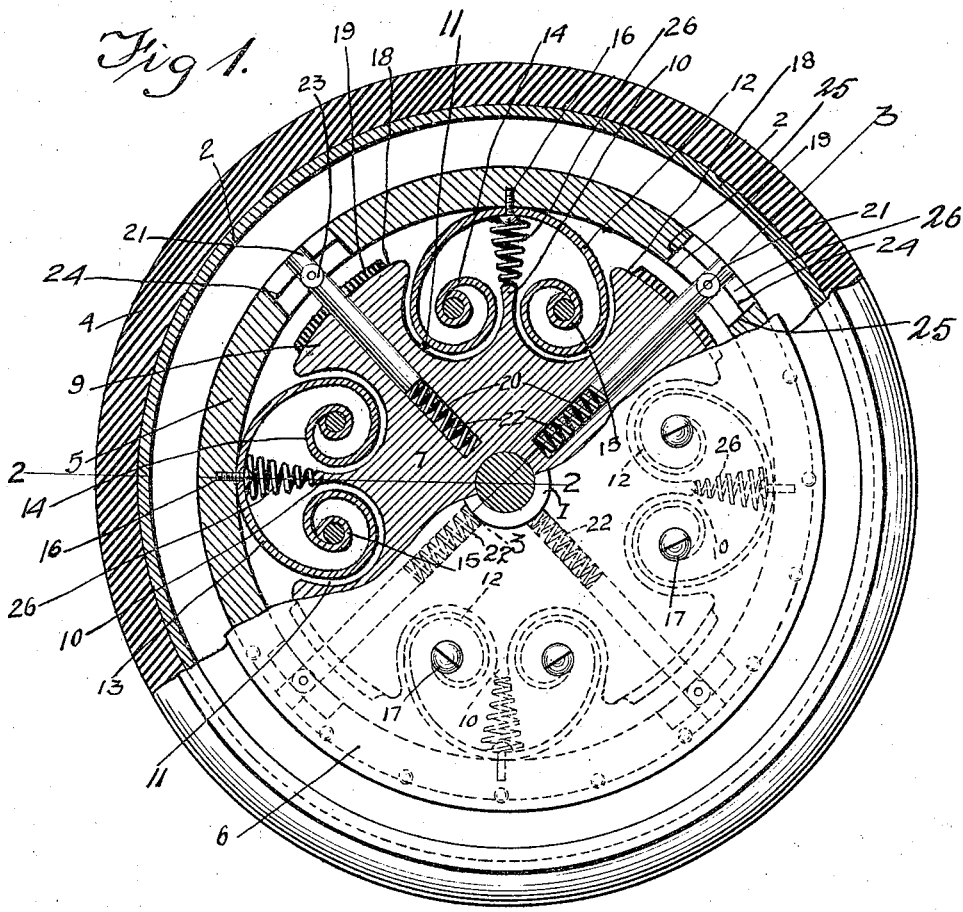
Figure 1 is a side elevation parts being broken away, illustrating the improved wheel.
Figure 2:
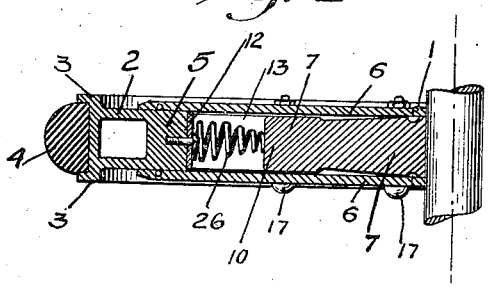
Fig. 2 is a diametrical section through the same, taken on line 2—2 of Fig. 1.
Figure 3:
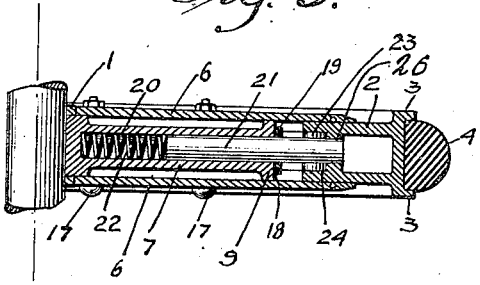
Fig. 3 is a similar view taken on line 3—3 of Fig. 1.

The wheel contemplated in this invention comprises a hub 1 and an outer tire carrying rim 2 having tire retaining flanges 3 and adapted to have placed thereon a tire 4 of the solid or cushion type or one not subjected to punctures and blow-outs. The rim 2 has formed on the inner side thereof an annular web 5 narrower than the body of the rim 2. The rim 2 with its web 5 has a positive connection with the hub by means hereinafter particularly described.

Secured to and surrounding the hub 1 are side plates 6 each of which is substantially in the form of a disk, said plates 6 having their inner surfaces arranged at a slightly greater distance apart than the thickness of the web 5 so that said web may slide freely between the plates 6 without admitting dirt and other foreign matter. The plates 6 serve as housing means for the springs and other parts contained between said plates and said side plates also serve as efficient bracing means for the general wheel structure.

Arranged between the plates 6 is a spring supporting member comprising a main body or web 7 which has its periphery of irregular formation as illustrated in Fig. 1. The spring supporting member as a whole, comprises a plurality of arms 9 extending in a general radial direction with respect to the center of the wheel and is also formed with radial extending tongues 10 mid-way between the arms. The formation of the arms 9 and the tongues 10 is such as to provide pockets or recesses 11 in which certain portions of the rim supporting springs are received.

Interposed between the spring support and the web 5 of the tire carrying rim 2 is a circular series of resilient members or springs 12. Each of said springs comprises a main body portion or major convolution 13, and a plurality of end portions or minor convolutions 14 terminating in attaching eyes 15. This gives to each of the springs 12 a heart shaped contour. The major convolutions or main body portion 13 of each spring 12 is secured in fixed relation to the inner face of the web 5 of the tire carrying rim by fastening means 16 shown in the form of a bolt or screw. The eyes 15 of each spring receive fasteners 17 shown in the form of bolts or rivets which are inserted through the side plates 6 and which therefore have a two-fold function; first said bolts serve as connecting and bracing means between the side plates 6 and secondly they serve as anchoring means for the extremities of the springs 12. Upon the outer longitudinally expanded wall or face 18 of each of the arms 9, there is secured a cushion 19 of rubber or other flexible material which will silently limit the inward movement of the tire carrying rim and prevent the undue compression of any of the springs 12 and the consequent breakage or fracture thereof. The springs are further protected by the particular contour of the outer periphery of the spring supporting member 7 and the shape of the recesses 11, the arms 9 and the tongues 10, such formation, clearly illustrated in Fig. 1, providing for the proper and efficient support of the minor convolutions of each of the springs while at the same time allowing for the necessary freedom thereof to enable them to give their full resiliency to the support of the tire carrying rim.

The web 7 is provided with radial passages 20 having sliding plungers 21 therein and springs 22 bearing against said plungers to normally move the same in outward directions. These plungers extend through the arms 9 and at their outer ends, the plungers are provided with anti-friction rollers 23 which travel on the arcuate supporting surfaces of recesses 24 in the web 5. The shoulders 25 at the ends of said recesses 24 are designed to co-act with said rollers to limit the circumferential creeping of the rim around the said main body 7. The web 5 is also provided adjacent the recesses 24 with other recesses 26 permitting movement of the spokes 21, these recesses 26 being of less width than the recesses 24 so that bearing surfaces will be provided for the rollers 23.

As a further form of cushion employed, springs 26 are interposed between the rim 5 and said tongues 10, as shown.

The wheel hereinabove described is particularly designed with reference to the use thereof in conjunction with automobiles and motor vehicles generally, also motorcycles; it will of course be understood that the wheel may be used in any other desirable connection and that it may be made of any size. The springs may be made of any desired stiffness, of any suitable material and the number of springs may be increased or diminished in accordance with the size of the wheel and other conditions.

I claim:

In a resilient wheel, a hub, a tire carrying rim, side plates secured in fixed relation to the hub and receiving between them a portion of said rim, a saddle member interposed between the side plates and provided in its periphery with pairs of substantially semi-circular recesses defining therebetween radial arms, fastening members extending through said side plates and the recesses in said saddle member, a circular series of cardiac springs disposed in said recesses and each comprising a major convolution fastened at its center to the tire carrying rim and a plurality of minor convolutions at the ends of said major convolutions and terminating in eyes which engage about said fastening members, the outermost ones of said minor convolutions being normally spaced from the walls of said recesses in parallel relation thereto, the radially extending arms on said saddle being disposed between each set of minor convolutions of said springs and coiled springs disposed between the ends of said arms and the centers of the major convolutions of said cardiac springs.

In testimony whereof I affix my signature.

BERNARD CHARLES FISHER.